(12) United States Patent
Chhatpar et al.

(10) Patent No.: US 9,310,791 B2
(45) Date of Patent: Apr. 12, 2016

(54) METHODS, SYSTEMS, AND APPARATUS FOR CALIBRATION OF AN ORIENTATION BETWEEN AN END EFFECTOR AND AN ARTICLE

(75) Inventors: Siddharth Ram Chhatpar, Brookline, MA (US); Sandeep M. Naik, Belle Mead, NJ (US)

(73) Assignee: Siemens Healthcare Diagnostics Inc., Tarrytown, NY (US)

( * ) Notice: Subject to any disclaimer, the term of this patent is extended or adjusted under 35 U.S.C. 154(b) by 120 days.

(21) Appl. No.: 14/004,859

(22) PCT Filed: Mar. 16, 2012

(86) PCT No.: PCT/US2012/029501
§ 371 (c)(1),
(2), (4) Date: Sep. 12, 2013

(87) PCT Pub. No.: WO2012/129110
PCT Pub. Date: Sep. 27, 2012

(65) Prior Publication Data
US 2014/0005829 A1    Jan. 2, 2014

Related U.S. Application Data

(60) Provisional application No. 61/454,069, filed on Mar. 18, 2011.

(51) Int. Cl.
G05B 19/401 (2006.01)
B25J 9/16 (2006.01)
G05B 19/04 (2006.01)

(52) U.S. Cl.
CPC .............. *G05B 19/04* (2013.01); *B25J 9/1692* (2013.01); *G05B 2219/39021* (2013.01); *G05B 2219/39024* (2013.01)

(58) Field of Classification Search
CPC ...... B25J 9/1692; B25J 9/1684; B25J 13/086; G05B 19/04; G05B 2219/39021; G05B 19/401; G05B 19/4015; G05B 2219/36371; G05B 2219/40538
USPC ........................ 700/250, 254, 258, 259, 262
See application file for complete search history.

(56) References Cited

U.S. PATENT DOCUMENTS 4,260,187 A * 4/1981 Bejczy .................. B64G 1/646
                                                              244/172.5
4,423,998 A * 1/1984 Inaba .................... B25J 19/025
                                                              250/222.1

(Continued)

FOREIGN PATENT DOCUMENTS

EP          0 045 174 A1    2/1982
WO       2009/086164 A2    7/2009

OTHER PUBLICATIONS

PCT International Search Report and Written Opinion dated Jun. 14, 2012 (8 Pages).

(Continued)

*Primary Examiner* — Stephen Holwerda
(74) *Attorney, Agent, or Firm* — Dugan & Dugan, PC

(57) ABSTRACT

Disclosed are methods adapted to aid in a calibration of a robotic end effector. The method includes providing a robotic component having an end effector and a light beam sensor provided in a fixed orientation to the end effector fingers, rotating a light beam of the light beam sensor relative to a geometrical calibration feature of a teach tool mounted in an approximately known orientation to an article, and determining a precise location (e.g., center) of the geometrical calibration feature based upon engagement of the light beam with edges of the geometrical calibration feature. In another aspect, a rotational orientation of the fingers of the end effector are calibrated using the teach tool. A novel teach tool and a robot calibration system including the teach tool are disclosed, as are other aspects.

20 Claims, 8 Drawing Sheets

(56) References Cited

U.S. PATENT DOCUMENTS

| | | | | |
|---|---|---|---|---|
| H65 H | * | 5/1986 | Beni | B25J 19/021 356/621 |
| 4,849,643 A | * | 7/1989 | Mundy | G01B 11/26 250/559.15 |
| 5,177,563 A | * | 1/1993 | Everett | B25J 9/1692 356/621 |
| 6,934,606 B1 | * | 8/2005 | Genetti | H01L 21/67201 118/712 |
| 7,490,398 B1 | | 2/2009 | Klassen et al. | |
| 2005/0102064 A1 | | 5/2005 | Donoso et al. | |
| 2009/0302795 A1 | | 12/2009 | Nichols et al. | |
| 2009/0324032 A1 | * | 12/2009 | Chen | G01N 35/00732 382/128 |
| 2010/0280790 A1 | | 11/2010 | Rodnick et al. | |
| 2011/0106312 A1 | * | 5/2011 | Chen | B25J 9/1697 700/259 |
| 2011/0213490 A1 | * | 9/2011 | Liu | G01B 11/03 700/193 |

OTHER PUBLICATIONS

Supplementary European Search Report dated May 21, 2015, of corresponding European Patent Application No. 12760915.4, 7 Pages.

* cited by examiner

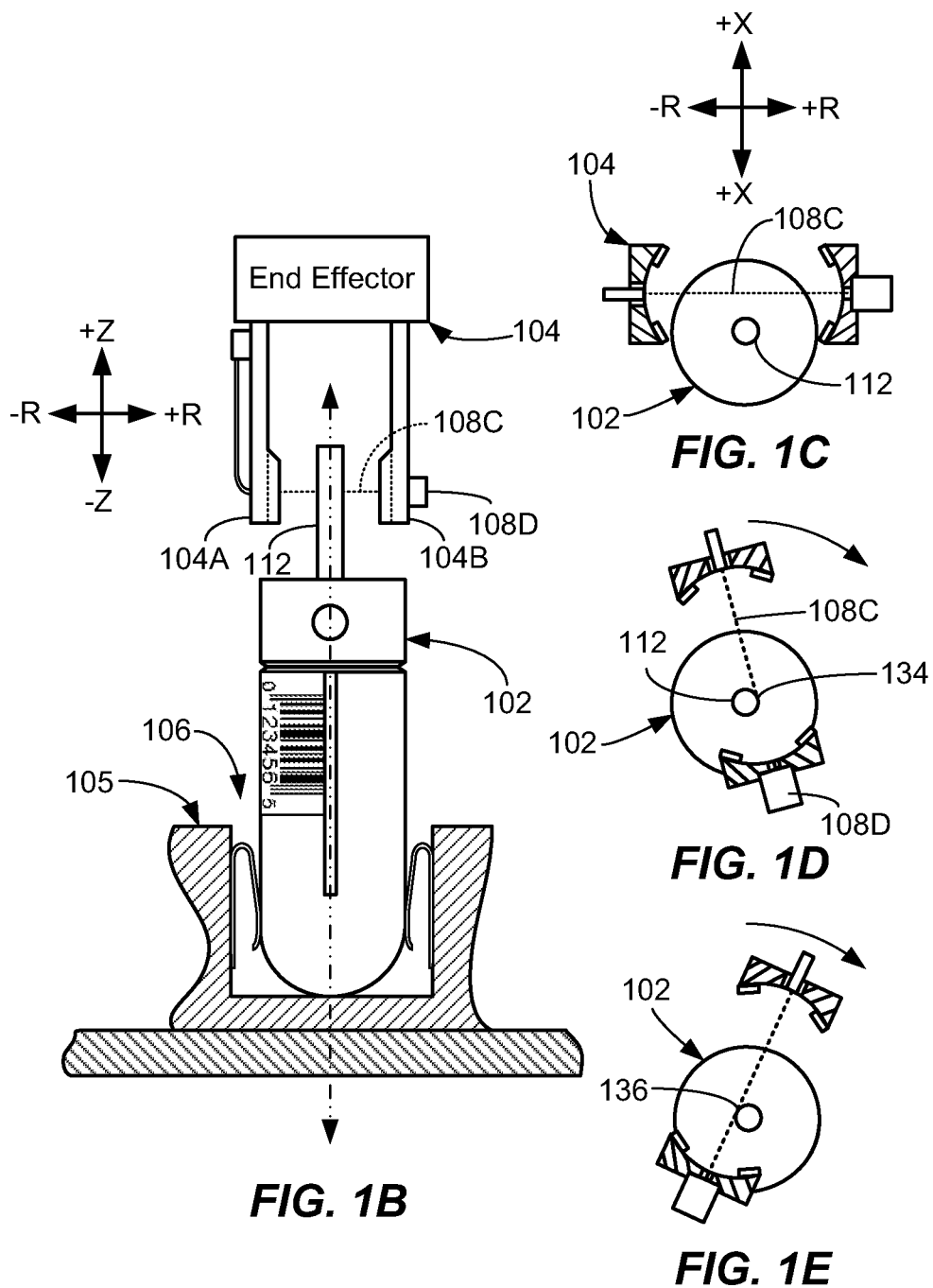

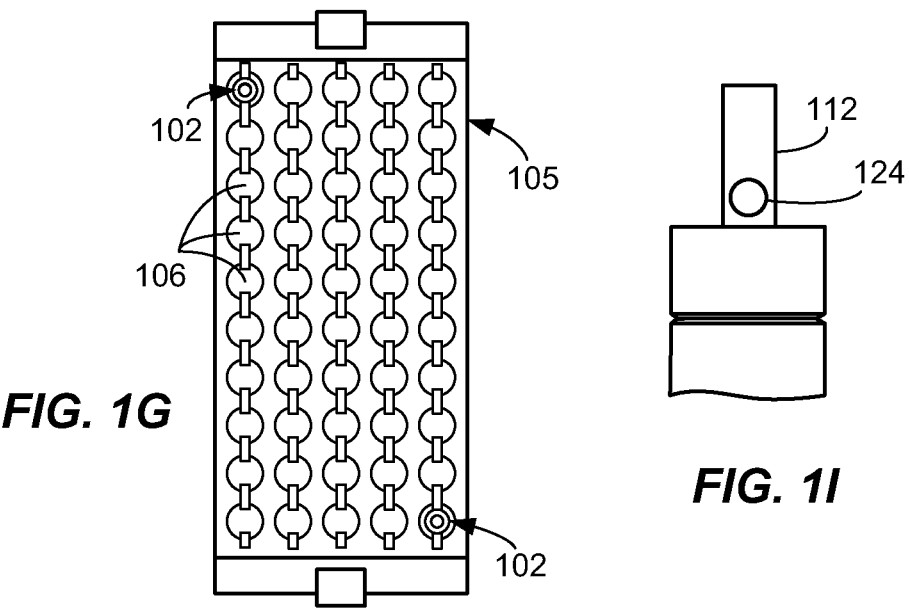
FIG. 1G
FIG. 1I
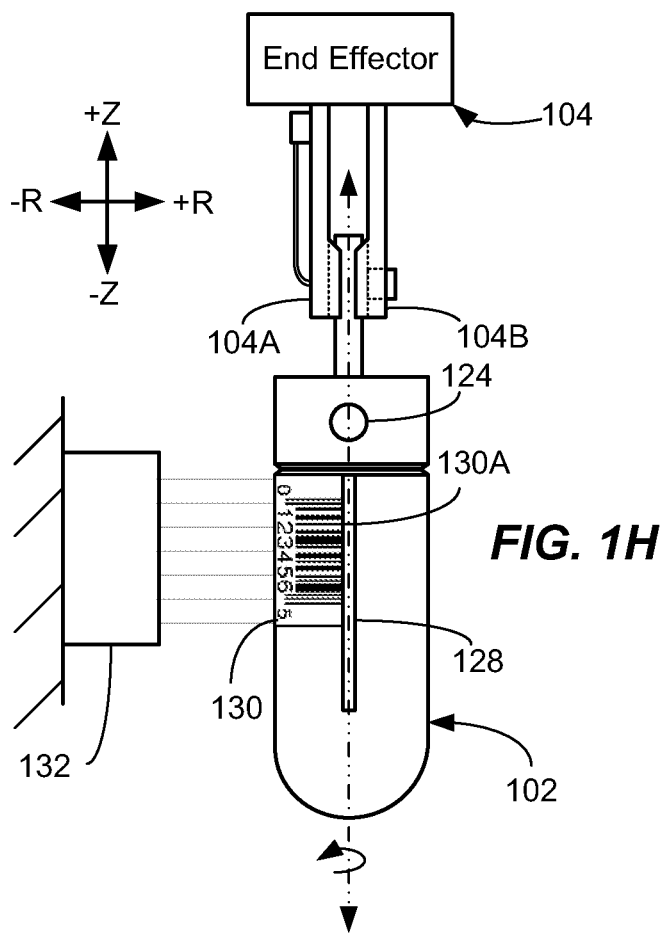
FIG. 1H

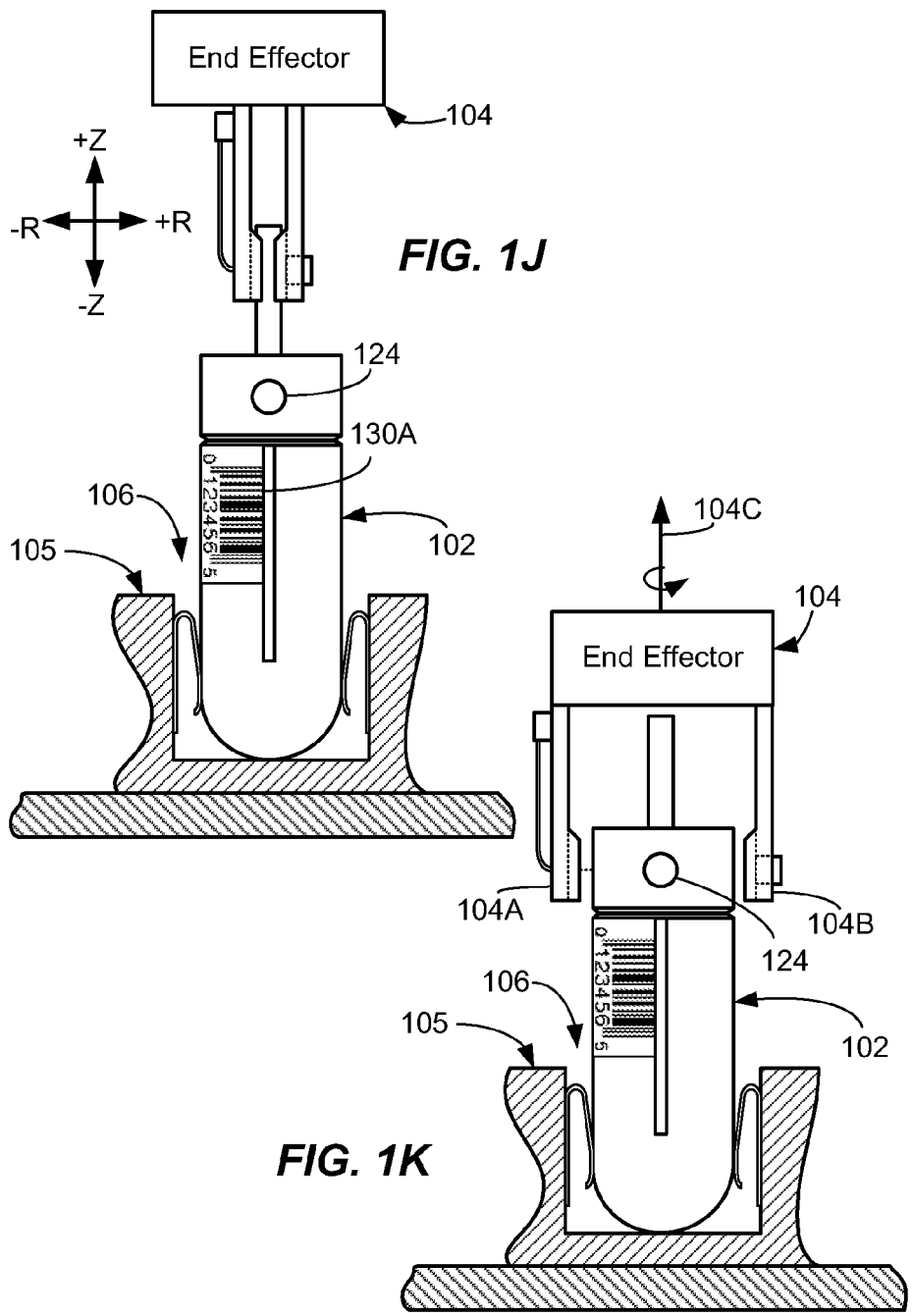

METHODS, SYSTEMS, AND APPARATUS FOR CALIBRATION OF AN ORIENTATION BETWEEN AN END EFFECTOR AND AN ARTICLE

RELATED APPLICATIONS

This application claims priority to International Application No. PCT/US2012/029501 filed Mar. 16, 2012, entitled "METHODS, SYSTEMS, AND APPARATUS FOR CALIBRATION OF AN ORIENTATION BETWEEN AN END EFFECTOR AND AN ARTICLE," which claims priority to U.S. Provisional Application Ser. No. 61/454,069 entitled "METHODS, SYSTEMS, AND APPARATUS FOR CALIBRATION OF AN ORIENTATION BETWEEN AN END EFFECTOR AND AN ARTICLE" filed on Mar. 18, 2011, the disclosures of which are hereby incorporated by reference in their entirety herein.

FIELD OF THE INVENTION

The present invention relates generally to methods, systems, and apparatus adapted to calibrate a positional orientation of a robotic component.

BACKGROUND OF THE INVENTION

In medical testing and processing, the use of robotics may minimize exposure to, or contact with, bodily fluid samples (otherwise referred to as "specimens") and/or may increase productivity. For example, in some automated testing and processing systems (e.g., clinical analyzers and centrifuges), sample containers (such as test tubes, sample cups, vials, and the like) may be transported to and from sample racks (sometimes referred to as "cassettes") and to and from a testing or processing location or system.

Such transportation may be accomplished by the use of an automated mechanism, which may include a suitable robotic component (e.g., a moveable robot arm or gantry arrangement) having a moveable end effector that may have gripper fingers coupled thereto. The end effector may be moved in two or more coordinate directions (e.g., X, R, and Z). In this way, a sample container (containing a specimen to be tested or processed) may be gripped by the end effector, and then moved from one location to another in relationship to the testing or processing location or system. For example, the sample container may be moved to and from a receptacle of a sample rack.

Inaccurate calibration may result in inaccurate positioning of the end effector and may cause collisions or jams between the end effector and the sample container, and/or between the sample container being moved and the testing or processing system or sample rack. Additionally, inaccurate calibration may contribute to jarring pick and place operations of the sample container, which may contribute to unwanted spillage of specimen from the sample container. Furthermore, knowing a precise rotational orientation of the end effector fingers may allow for the manufacture of smaller sample racks, in that the fingers may be placed in a defined orientation when grasping the sample container, thereby allowing the distance between respective sample containers in the sample rack in other directions to be minimized.

Accordingly, methods, systems, and apparatus that may improve accuracy of positioning of a robotic component relative to an article, such as a sample rack, in testing and processing systems are desired. Furthermore, methods that improve accuracy of positioning of robot fingers of end effectors are also desired.

SUMMARY OF THE INVENTION

In a method aspect, an improved method of calibrating a position of an article relative to an end effector of a robot is provided. The method includes providing a robotic component having the end effector with end effector fingers and a light beam sensor provided in a fixed orientation to the end effector fingers; providing a teach tool at an approximately known location on the article within a work envelope reachable by the end effector, the teach tool having a geometrical calibration feature; positioning the end effector with the light beam sensor at a first location proximate to the geometrical calibration feature; rotating the end effector and sensing with the light beam sensor a first engagement edge of the geometrical calibration feature of the teach tool; and rotating the end effector and sensing with the light beam sensor a second engagement edge of the geometrical calibration feature of the teach tool.

According to another aspect, an improved robot calibration system is provided. The system includes a robotic component having an end effector with end effector fingers; a light beam sensor provided in a fixed orientation to the end effector fingers; a teach tool coupled to an article at a first location, the teach tool including a geometrical calibration feature; and a controller adapted to rotate a light beam of the light beam sensor around the geometrical calibration feature of the teach tool and calculate a position thereof based upon edge interferences between the geometrical calibration feature and the light beam.

In an apparatus aspect, a calibration assisting tool is provided. The calibration assisting tool includes a base adapted to couple to an article; a first geometrical calibration feature extending from the base, the geometrical calibration feature including a cylindrical post extending from the base; a second geometrical calibration feature including a flat surface; and a third geometrical feature extending crosswise through the base or cylindrical post.

In another method aspect, a method of calibrating a rotational position of fingers of an end effector is provided. The method includes providing a robotic component having the end effector and a light beam sensor provided in a fixed orientation to the end effector fingers; providing a teach tool within a work envelope reachable by the end effector, the teach tool having a rotational geometrical calibration feature; grasping the teach tool with the fingers of the end effector and rotating the teach tool relative to a scanner; scanning the teach tool during the rotation to determine a rotational orientation of the teach tool; positioning the teach tool with the end effector in a known rotational orientation and releasing the end effector fingers from the teach tool; positioning the end effector with the light beam sensor proximate to the rotational geometrical calibration feature; and rotating the end effector and the light beam of the light beam sensor to determine the rotational orientation of the fingers relative to the rotational geometrical calibration feature.

Still other aspects, features, and advantages of the present invention may be readily apparent from the following detailed description by illustrating a number of exemplary embodiments and implementations, including the best mode contemplated for carrying out the present invention. The present invention may also be capable of other and different embodiments, and its several details may be modified in various respects, all without departing from the spirit and scope of the present invention. Accordingly, the drawings and descriptions are to be regarded as illustrative in nature, and not as restrictive. The drawings are not necessarily drawn to scale. The invention is to cover all modifications, equivalents, and alternatives falling within the scope of the invention.

BRIEF DESCRIPTION OF THE DRAWINGS

FIG. 1B is a partially cross sectioned side view graphical depiction that illustrates a position of an end effector relative to a cylindrical post of the teach tool during a measurement step according to embodiments of the invention.

FIG. 1C is a top view graphical depiction that illustrates a starting position of a light beam of a light beam sensor relative to a teach tool in X-R coordinates according to embodiments of the invention.

FIG. 1D is a top view graphical depiction that illustrates a first edge engagement position of a light beam of a light beam sensor relative to a teach tool in X-R coordinates according to embodiments of the invention.

FIG. 1E is a top view graphical depiction that illustrates a second edge engagement position of a light beam of a light beam sensor relative to a teach tool in X-R coordinates according to embodiments of the invention.

FIG. 1G is a top view of a sample rack including multiple teach tools installed in receptacles at diagonal corners thereof according to embodiments of the invention.

FIG. 1H is a side view graphical depiction that illustrates end effector fingers of an end effector rotating the teach tool relative to a scanner according to embodiments of the invention.

FIG. 1I is a partial side view illustrating an alternate embodiment of a teach tool according to embodiments of the invention.

FIG. 1J is a partially cross sectioned side view graphical depiction that illustrates an end effector placing the teach tool in a sample rack in a known orientation according to embodiments of the invention.

FIG. 1K is a partially cross sectioned side view graphical depiction that illustrates a light beam of a light beam sensor being rotated relative to a rotational geometrical calibration feature of a teach tool according to embodiments of the invention.

DETAILED DESCRIPTION

Figure 1A:
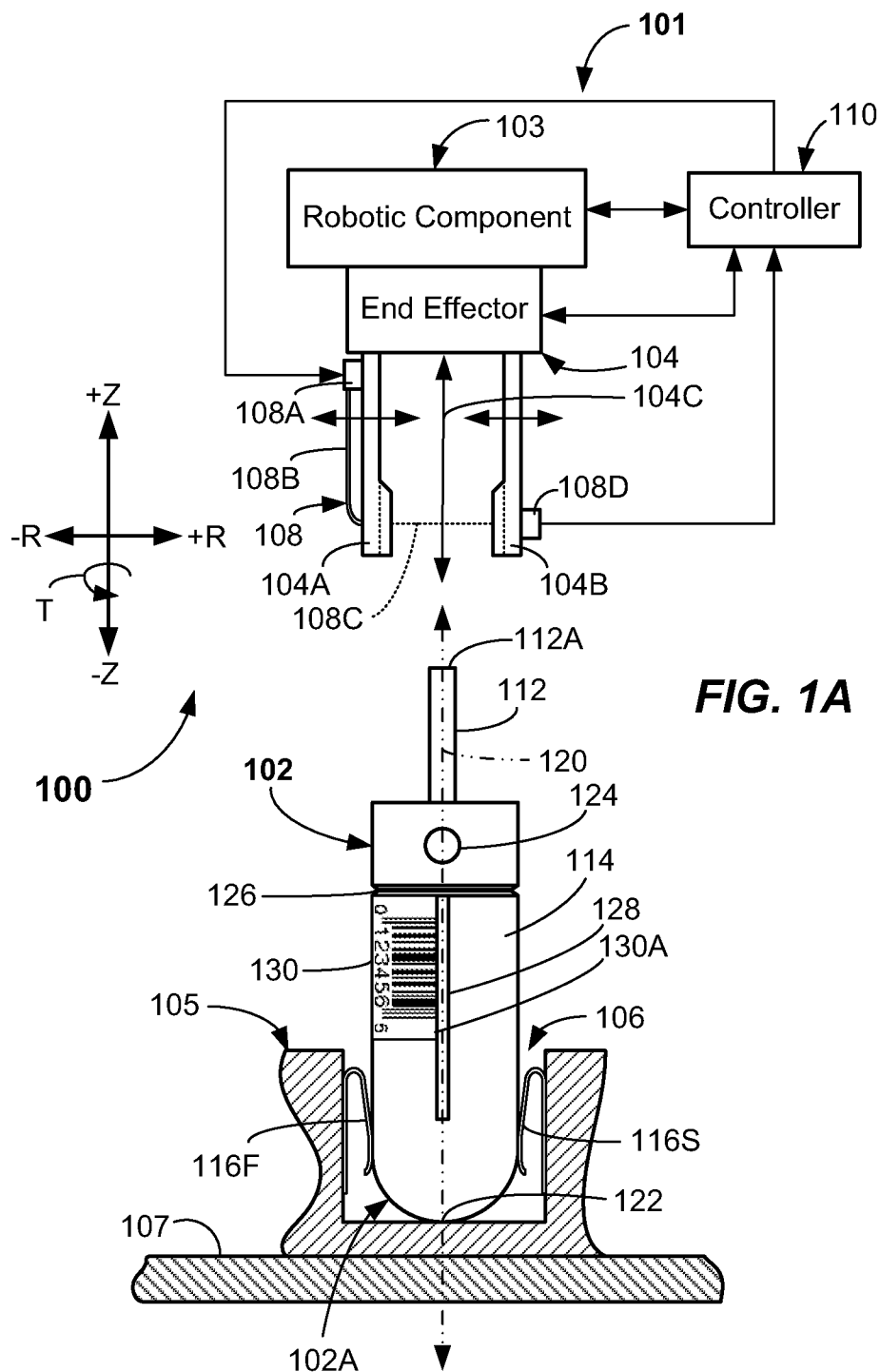
FIG. 1A is a partially cross sectioned side view illustration of an exemplary robot assembly and calibration-assisting teaching tool according to embodiments of the invention.

In robotic apparatus, such as those used to accomplish robotic pick and place operations in clinical analyzers or other testing or processing systems, for the aforementioned reasons, achieving precision in the placement of robotic end effector fingers is desirable. "End effector" as used herein is any member coupled to a robot that is used in robotic operations to grasp and/or move a device (e.g., a sample container) from one location to another, such as in a pick and place operation. In such robotic systems, positional precision to several thousands of an inch or less may be desirable. However, in many instances, tolerance stack-ups due to manufacturing variances and assembly variances of the multitude of connected system components may amount to many thousandths, or many hundredths, or even many tenths of an inch. Accordingly, means for appropriately determining an actual position of a robotic end effector relative to an article (e.g., in X and R; X, R, and Z; X, R, and T, or X, R, Z, and T) in such a robotic system is desired.

In view of the foregoing problems, the present invention provides calibration methods, calibration systems, and calibration assisting tools for readily determining an actual position of an article relative to an end effector in a robotic system.

In a first aspect, a method of calibrating a position of an article relative to an end effector of a robot is provided. The method includes providing a robot with an attached end effector and end effector fingers and a light beam sensor provided in a fixed orientation thereto, and a teach tool on the article. The light beam sensor may be fixed (immoveable) vertically, and horizontally (in X-R coordinates) relative to the end effector, and fixed relative to the fingers such that a light beam always remains in a fixed orientation relative to the fingers, i.e., the light beam rotates with the fingers. The teach tool has a geometrical calibration feature (e.g., a cylindrical post) thereon. The light beam sensor is positioned proximate to the geometrical calibration feature and rotated to sense with the light beam several engagement edges of the geometrical calibration feature. A location of the geometrical calibration feature is calculated based upon the sensed location of several engagement edges. Once the location of the geometrical calibration feature is determined, another feature of the teach tool may be measured (e.g., a vertical geometrical calibration feature) such that orientation in another degree of freedom (e.g., the Z direction) may be determined. In other embodiments, an orientation of a rotational geometrical calibration feature (e.g., a hole through the teach tool) of the teach tool may be determined by orienting and rotating the fingers and light beam sensor relative to the rotational geometrical calibration feature. This may determine an orientation of the end effector fingers in a T direction (e.g., rotation).

In another aspect, a robot calibration system is provided. The robot calibration system includes a robotic component having a moveable end effector with end effector fingers, and a light beam sensor provided on the end effector. The system also includes a teach tool coupled to an article at a first location whose orientation is to be determined, wherein the teach tool has a geometrical calibration feature thereon. The system includes a controller adapted to rotate a light beam of the light beam sensor around the geometrical calibration feature of the teach tool and thereafter calculate a position (e.g., center in X-R coordinates) of the geometrical calibration feature that is based upon edge interferences between the geometrical calibration feature and the light beam.

In another aspect, a calibration assisting tool is provided. The calibration assisting tool includes a base adapted to couple to an article, a first geometrical calibration feature extending from the base, the geometrical calibration feature including a cylindrical post extending from the base; a second geometrical calibration feature including a flat surface; and a third geometrical feature extending crosswise through the base or cylindrical post.

In yet another aspect, a method of calibrating a rotational orientation of end effector fingers of an end effector is provided. The method involves scanning the teach tool to determine an orientation of a rotational geometrical calibration feature thereon, placing the tool in a known orientation (e.g., in a receptacle of a sample rack), and then rotating the end effector fingers about the teach tool to determine the rotational orientation of the fingers to the rotational geometrical calibration feature of known orientation.

These and other aspects and features of the invention will be described with reference to FIGS. 1A-3 herein.

In accordance with a first embodiment of the invention, as best shown in FIGS. 1A-1K, a robot calibration system 100 is described. The robot calibration system 100 is useful for aiding in the calibration of any robotic system, such as those used in automated clinical analyzers, centrifuges, or other processing or testing systems (e.g., biological fluid specimen processing or testing systems). In particular, the calibration system 100 is useful for precisely calibrating the location of a receptacle 106 of a sample rack 105 adapted to receive one or more sample containers containing biological fluid (e.g., blood collection tubes, etc.). The robot calibration system 100 includes a robotic apparatus 101 and a teach tool 102.

The robotic apparatus 101 includes a robotic component 103 having an end effector 104 being coupled thereto. The end effector 104 may have two or more moveable jaws or fingers 104A, 104B that are adapted to grasp components, such as sample containers (e.g., sample tubes) and/or sample racks 105 that are adapted to receive sample containers in one or more receptacles 106 thereof. A partial cross sectional view of the sample rack 105 is shown in FIG. 1A. Only one receptacle 106 is shown. However, it should be recognized that the sample rack 105 may include one or more than one receptacle (see FIG. 1G) and thus may receive a number of sample containers therein.

Prior to calibration, the location of the sample rack 105 on a component of the testing or processing system may be only "generally known" in three-dimensional space. For example, the location of the sample rack 105 on a system component, such as on a tray or portion of a frame 107 of the system may only be "generally known." The sample rack 105 may include one or more geometrical features that aid in generally locating the sample rack 105 on the tray or frame 107, such as locator pins or features, tabs, locking mechanisms, or other orienting features (not shown). It is said herein that the location of the sample rack 105 may only be "generally known" because of the tolerance stack-ups in manufacturing of the system, and that a precise location of one or more of the receptacles 106 is desired to be "precisely known" for the reasons listed above. Accordingly, the present invention (method and system) has great utility in enabling a location of one or more receptacles 106 of the sample rack 105 to be "precisely known," that is known with a relative high degree of certainty or precision.

In more detail, the robotic apparatus 101 includes a light beam sensor 108 that enables the robotic apparatus 101 to gauge whether the gripper fingers 104A, 104B have an item in their vicinity to grasp. The light beam sensor 108 may include fiber optic components, such as a light source 108A, an optical fiber 108B adapted to carry and direct a light beam 108C, and a light detector 108D adapted to receive and detect a presence of a light beam 108C thereat. The light beam sensor 108 functions to send a light beam 108C from the optical fiber 108B to the detector 108D. The light beam sensor 108 may be coupled directly to a portion of the end effector 104 or to a portion of the robotic component (e.g., to a robot arm, boom, or beam), but the location between the centerline axis 104C of the end effector 104 and the light beam sensor 108 is fixed and known. Preferably, the light beam 108C is oriented so that the light beam 108C passes through the centerline axis 104C of the end effector 104 (i.e., through the T axis of rotation). For example, the light beam 108C may be oriented generally horizontally. The light beam 108C may be made as small as practical. Likewise, the Z dimension between the lower terminal ends of the gripper fingers 104A, 104B or gripping members of the end effector 104 and the light beam 108C is also fixed and known. Rotation of the fingers 104A, 104B of the end effector 104 relative to the robotic component 103 causes the light beam 108C to also rotate with the fingers 104A, 104B in a fixed relationship thereto.

The robotic apparatus 101 may include a suitable controller 110 that may command the robotic component 103 and attached end effector 104 and move the end effector 104 and light beam sensor 108 in one or more coordinate directions, two or more coordinate directions (e.g., X and R), three or more coordinate directions (e.g., X, R, and Z or X, R, and T), or even four directions (e.g., X, R, Z, and T), where X is into and out of the paper in FIG. 1A, R is laterally on the paper, Z is vertically on the paper, and T is a rotation about the axis 104C of the end effector 104. The controller 110 may be any suitable controller adapted to interact with the robotic component 103, and may include a suitable microprocessor, memory, conditioning electronics, and circuitry adapted to carry out the motions, measurements, and calculations associated with the calibration and motion of the robotic component 103 and end effector 104.

Any suitable robotic component 103 may be used, such as a moveable multi-arm robot (e.g., having included one or more shoulder, elbow, or wrist elements), a telescopic boom robot, or a beam or beams having one or more motors coupled thereto. Any suitable mechanism for imparting motion to the end effector 104 may be used. In one implementation, the robotic component 103 may be used to accomplish three-dimensional coordinate motion (X, R, and Z) of the end effector 104 so that sample containers may be placed in a receptacle 106 of a sample rack 105. Additionally, the robotic component 103 may accomplish a rotation (T) of the end effector 104, which is rotation about the axis 104C, so that the fingers 104A, 104B may be precisely oriented relative to a sample container (not shown) in a sample rack 105, or relative to the sample rack 105 when a sample container is being inserted in the sample rack 105.

The robotic component 103 may include a moveable assembly including an R axis motor adapted to impart R axis motion to the end effector 104 relative to a frame of the testing or processing system, an X axis motor adapted to cause X axis motion of the end effector 104 relative to the frame, a Z axis motor adapted to cause Z axis motion of the end effector 104 relative to the frame, and a T axis motor adapted to cause rotation of the end effector fingers 104A, 104B relative to the frame in the T direction (about the axis 104C). Suitable feedback mechanisms may be provided for each degree of motion, such as position and/or rotation sensors. The robotic component 103 may include suitable tracks or guides and suitable motors, such as one or more stepper motors, servo motors, pneumatic or hydraulic motors, electric motors, or combinations thereof. Furthermore, drive systems including chains, guides, pulleys and belt arrangements, gear or worm drives or other conventional drive components may be utilized to cause the various motion of the end effector 104. Other types of robotic components 103 may be employed.

Again referring to FIGS. 1A-1B, the opposed gripper fingers 104A, 104B may be driven to open and close along any suitable direction in the X-R plane (e.g., in the X or R direction or combinations thereof) by a suitable end effector finger drive apparatus, such as a pneumatic or hydraulic servo motor or the like. Any suitable mechanism for causing gripping action of the fingers 104A, 104B may be used. Furthermore, although two fingers are shown, the present invention is equally applicable to end effectors having more than two fingers or grippers, albeit in such a case, the light beam sensor 108 may be positioned other than on the fingers, but rotatable therewith and provided in a fixed Z orientation to the end effector 104.

As previously mentioned, the robot calibration system 100 includes one or more teach tools 102. The one or more teach tools 102 may be mounted to the article (e.g., sample rack 105) for which the precise positional calibration is to be determined. For example, in the present instance, one or more teach tools 102 may be mounted in one or more receptacles 106 of the sample rack 105. The sample rack 105 and teach tool 102 may be placed in a testing or processing system at any location within the reach of the robotic component 103. For example, the sample rack 105 may be placed and locked in a generally-known position in the testing or processing system within the reach of the robotic component 103.

As shown in FIG. 1G, one or more teach tools 102 may be used to assist in a determination (calibration) of a position of one or more receptacles 106 in a multi-sample sample rack 105. A fifty position sample rack 105 is shown. However, the present invention is applicable to calibration of the location of receptacles 106 in any sized sample rack. In the depicted embodiment, the calibration may take place at one or more locations in the sample rack 105. For example, teach tools 102 may be provided at opposite diagonal corners of the sample rack 105, as shown. Optionally, other locations may be used. In some embodiments, the teach tool 102 may have a rounded bottom 102A having a radius and diameter such that it resembles the geometry of a sample container (e.g., sample tube). The teach tool 102 may be manually inserted in the receptacle 106. Optionally, the teach tool 102 may be picked up from a designated and known home location in the testing or processing system, and delivered to a receptacle 106 by the robotic component 103.

In the depicted embodiment, teach tool 102 includes a geometrical calibration feature 112. The geometrical calibration feature 112 may be a generally cylindrical post extending upwardly from a base 114 of the teach tool 102. The teach tool 102 may be received securely in the receptacle 106 of the sample rack 105 by any suitable means, such as first and second leaf springs 116F, 116S (FIG. 1A). The teach tool 102 may register (e.g., contact) at the bottom of the receptacle 106 in the same manner as does a sample tube. The geometrical calibration feature 112 may be oriented in a geometrical center of the receptacle 106 and may be used to determine a center location of the receptacle in the X-R plane. The teach tool 102 may further include a vertical geometrical calibration feature 112A, which may comprise a planar upper surface that is generally perpendicular to a tool axis 120 extending through the center of the geometrical calibration feature 112, i.e., through the center of the cylindrical post. The vertical geometrical calibration feature 112A is used to determine and calibrate a vertical orientation of the bottom registry point 122 (e.g., the point contacted by a sample tube) of the rack 105 in the Z direction. The vertical length of the teach tool 102 and the diameter of the geometrical calibration feature 112, i.e., the cylindrical post, are precisely known. The vertical length from end to end of the teach tool 102 may be about 100 mm, for example. The diameter of the cylindrical post may be about 2.54 mm, for example. The length of the cylindrical post may be about 20 mm, for example. The diameter of the base 114 may be about 16 mm, for example. Other dimension may be used.

In another aspect, the teach tool 102 may include a rotational geometrical calibration feature 124 that is used to determine and calibrate a rotational orientation of the end effector fingers 104A, 104B. Knowing the rotational orientation of the fingers 104A, 104B allows the rack 105 to be made smaller in at least one direction, because the clearance needed for the fingers 104A, 104B may be eliminated in that direction. In some embodiments, the rotational geometrical calibration feature 124 may comprise a through hole formed through the teach tool 102. The through hole may be formed crosswise through the body or optionally through the post as is shown in FIG. 1I. The through hole may include a center axis that intersects the axis of the geometrical calibration feature 112. The hole is preferably of constant diameter along its length and may have a diameter of about 2.54 mm, for example. Other diameters may be used.

Additionally, the teach tool 102 may include a hoop groove 126 that may encircle the perimeter of the base 114. Furthermore, the teach tool 102 may include a start groove 128 that extends along a direction parallel to the tool axis 120, i.e., in a vertical orientation. Furthermore, a bar code label 130 may be positioned and affixed on the surface of the teach tool 102, such as on the base 114 thereof. The bar code label 130 may be affixed to the base 114 in a known orientation, such as shown. In particular, the location of the start groove 128 may be generally aligned with the axis 120 and also with the axis of the rotational geometrical calibration feature 124. The bar code 130 may include a detectable feature such as a detectable edge 130A placed so as to abut an edge of the start groove 128. The detectable edge 130A may be detectable by a bar code reader 132 (FIG. 1H), as will be explained below. The detectable edge 130A may be formed by the right end of each of the bars of the bar code label 130 or another detectable feature of the bar code label 130. This detectable edge 130A is provided in a generally known orientation to the start groove 128 and to the rotational geometrical calibration feature 124.

Figure 1F:
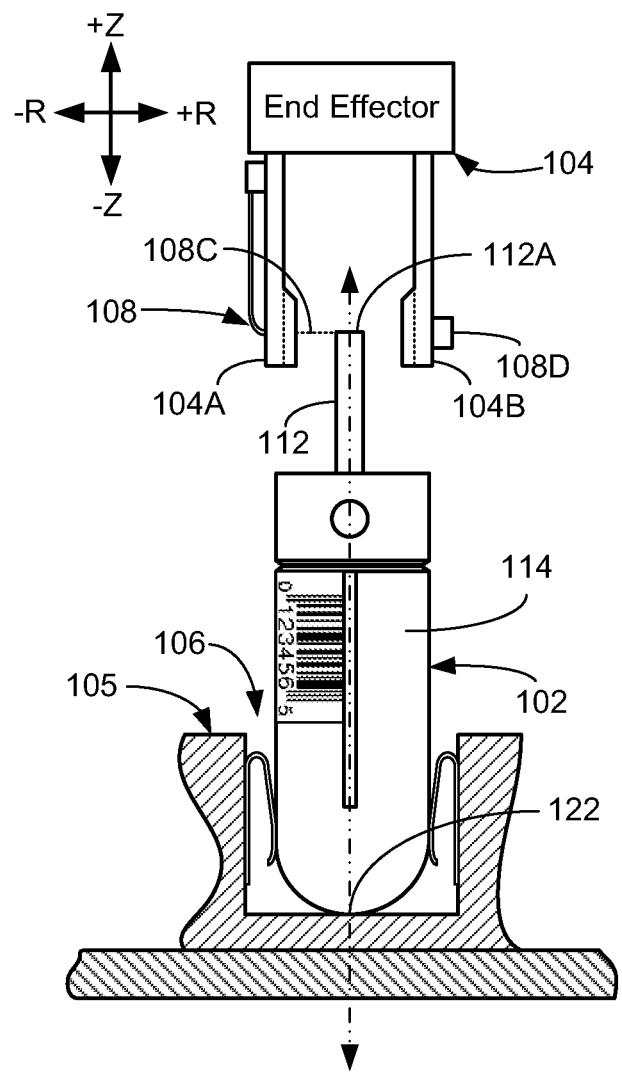
FIG. 1F is a partially cross sectioned side view graphical depiction that illustrates a position of an end effector relative to a vertical geometrical calibration feature of the teach tool during a vertical measurement step according to embodiments of the invention.
Figure 2:
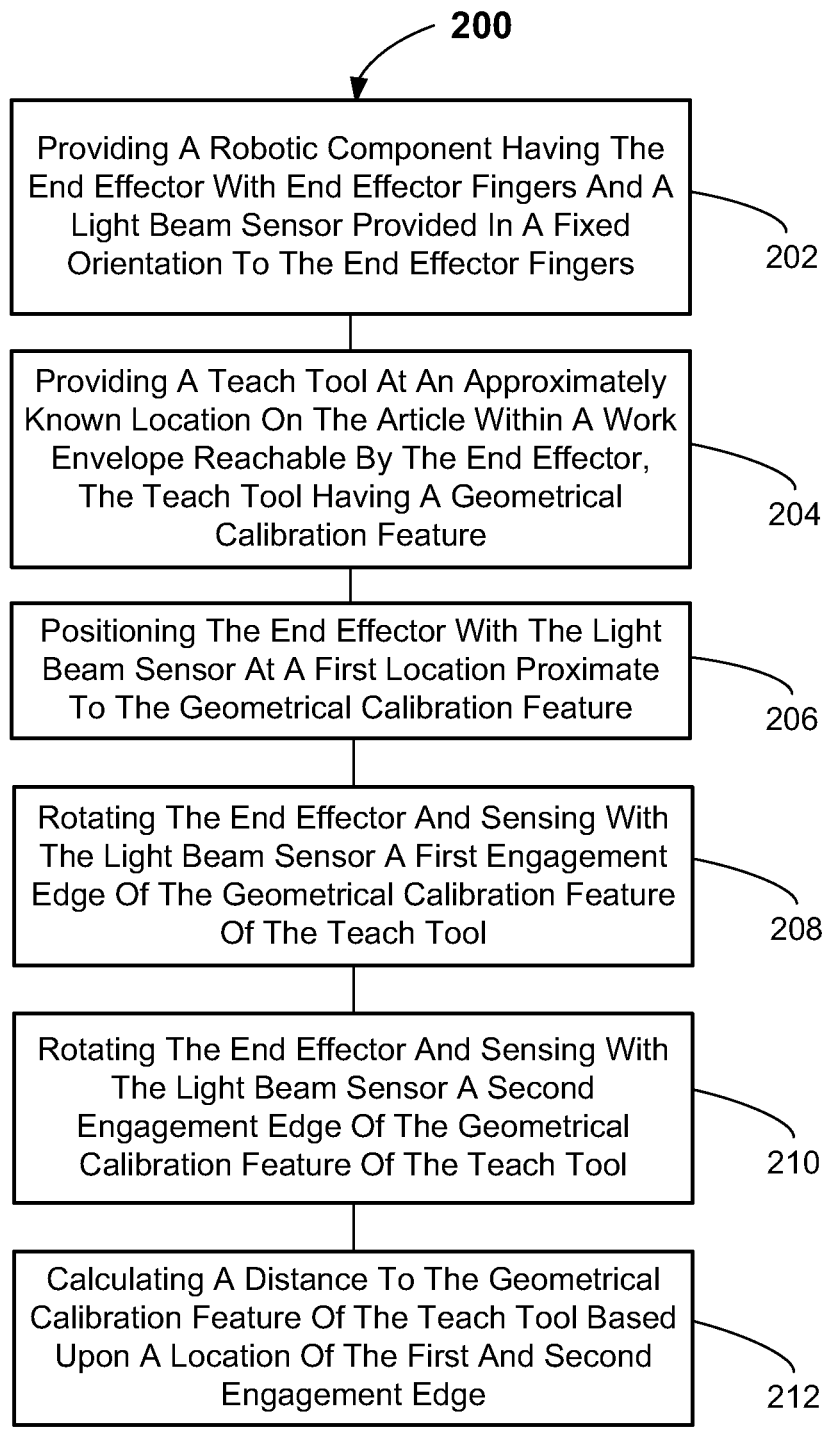
FIG. 2 is a flowchart illustrating a first method according to embodiments of the present invention.

A first method aspect of a method 200 of the invention will now be explained in detail with reference to the flowchart in FIG. 2 and the robot calibration system 100 in FIGS. 1A-1F. In step 202, a robotic component 103 is provided having an end effector 104 with end effector fingers 104A, 104B and a light beam sensor 108 provided in a fixed orientation to the end effector fingers 104A, 104B. In step 204, a teach tool 102 is provided at an approximately known location on an article within a work envelope reachable by the end effector 104 wherein the teach tool 102 has a geometrical calibration feature 112 thereon. The article may be any component for which it is desired to obtain precise positional information in X, R, Z, T, or any combination thereof. For example, in one example, the article is a sample rack 105 and the teach tool 102 is situated on (bottomed in) the sample rack 105, such as in a receptacle 106 thereof. In step 206, the end effector 104 with the light beam sensor 108 is positioned at a first location proximate to the geometrical calibration feature 112 (e.g., adjacent to and vertically posited roughly midway along the cylindrical post). In particular, as shown in FIGS. 1B and 1C, the light beam 108C is provided at a position offset from the geometrical calibration feature 112 where the beam 108C will make contact with the geometrical calibration feature 112 upon rotation of the end effector 104. For example, the beam 108C may be located at about 6 mm to about 10 mm away from the geometrical calibration feature 112. In step 208, the end effector 104 is rotated from its initial position in FIG. 1C to a first rotational position as is shown in FIG. 1D. In this position, the light beam sensor 108 senses a first engagement edge 134 of the geometrical calibration feature 112 of the teach tool 102. The sensing occurs when the light beam 108C is first broken by the interference of the geometrical calibration feature 112 with the light beam 108C at the first engagement edge 134. As the light beam 108C is broken as shown in FIG. 1D, the detector 108D no longer provides a signal to the controller 110, and a first rotational orientation of the end effector 104 is recorded in memory of the controller 110. The rotational orientation of the end effector 104 may be provided by any suitable rotational sensor or feedback device coupled to the end effector 104 that provides a reading of the rotational position of the end effector fingers 104A, 104B about the axis 104C.

In step 210, the end effector 104 is again rotated, and a second engagement edge 136 of the geometrical calibration feature 112 of the teach tool 102 is sensed with the light beam sensor 108. In some embodiments, the light beam 108C may be rotated continuously from the contact with the first engagement edge 134 to the second engagement edge 136 in a clockwise direction, for example. As the light beam 108C is again sensed by the detector 108D as is shown in FIG. 1E, the second rotational position is recorded in memory. Although it is preferred that the rotation be in one direction (e.g., clockwise or counterclockwise) wherein during the rotational motion both edges 134, 136 are sensed, in some embodiments, the edges 134, 136 may be approached from alternate rotational directions. Once the rotational positions of the edges 134, 136 are determined, a length (distance) to the geometrical calibration feature 112 of the teach tool 102 based upon a location of the first and second engagement edges 134, 136 is calculated in step 212 by the controller 110. From this, the distance between the location of the center of the geometrical calibration feature 112 in the X-R plane and the center of the end effector 104 is determined. By moving the end effector 104 in the R and X directions and then repeating the edge finding routine, the exact location of the article (e.g., the receptacle 106 of the sample rack 105) may be precisely determined. If a more precise location is desired, the procedure above may be repeated by positioning the end effector 104 at a third location offset from the geometrical calibration feature 112 in the X-R plane and repeating the steps above, but relative to additional engagement edges of the geometrical calibration feature 112.

Figure 1L:
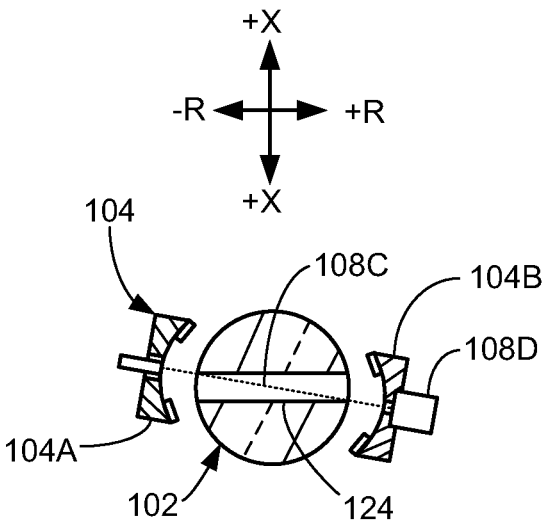
FIGS. 1L-1M are top cross sectioned views that illustrate a light beam of a light beam sensor being rotated relative to a rotational geometrical calibration feature of a teach tool according to embodiments of the invention.
Figure 1M:
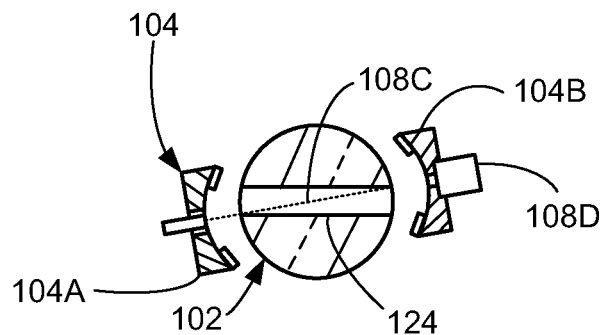
Figure 1N:
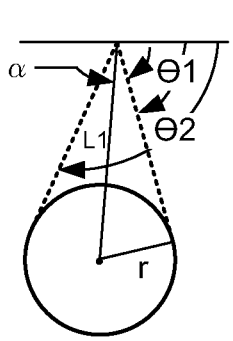
FIGS. 1N-1P are graphic illustrations showing the various geometrical features used to calculate a position of the geometrical calibration feature according to embodiments of the invention.
Figure 1O:
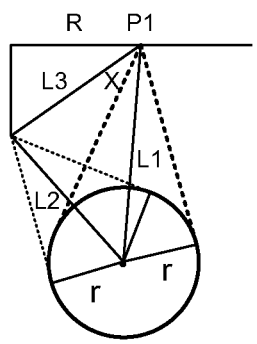
Figure 1P:
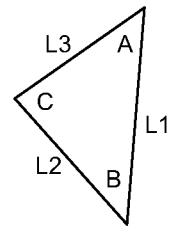

As shown in the graphic illustration of FIGS. 1N-1P, once the first and second angles $\theta_1$ and $\theta_2$ are determined, the calculation of the distance to the center is determined according to the following relationship in Equation 1:

$$L1 = r/\sin \alpha \qquad \text{Equation 1}$$

where $\alpha = \frac{1}{2}(\theta_2 - \theta_1)$.

Since R is known because the diameter D (i.e., D=2r) of the geometrical calibration feature 112 is precisely known, and $\alpha$ is known through measurement of first and second angles $\theta_1$ and $\theta_2$, L1 can be determined, wherein L1 is the distance between the center axis 104C of the end effector 104 and the center of the geometrical calibration feature 112. The exact location of the center of the geometrical calibration feature 112 in X-R coordinates may be more precisely determined by repeating the above method. Thus, the end effector 104 may be moved in the X and R directions by known amounts, and then the edge finding method described above for determining the center of the geometrical calibration feature 112 is repeated.

In more detail, a precise determination of the center may be obtained by moving the end effector 104 with the light beam sensor 108 to a second location proximate to the geometrical calibration feature 112 of the teach tool 102. The second location is different than the first location. The end effector 104 is again rotated and a third engagement edge of the geometrical calibration feature 112 is sensed with the light beam sensor 108 via breaking the light beam 108C. The rotation of the end effector 104 then may continue in the same direction and a fourth engagement edge of the geometrical calibration feature 112 is sensed when the light beam 108C is again detected by detector 108D of the light beam sensor 108. The length (L2) from the second rotation point to the center of the geometrical calibration feature 112 of the teach tool 102 may then be calculated based upon a location of the third and fourth engagement edge and using Equation 2:

$$L2 = r/\sin \alpha \qquad \text{Equation 2}$$

where $\alpha = \frac{1}{2}(\theta_4 - \theta_3)$.

Once L1 and L2 are known, an exact location of the center of the geometrical calibration feature 112 of the teach tool 102 relative to the centerline axis 104C of the end effector 104 in the X-R plane may be determined geometrically using the cosine rule of Equations 3, 4, and 5 below and referring to FIGS. 1N-1P.

$$L3 = (X^2 + R^2)^{1/2} \qquad \text{Equation 3}$$

$$C = \cos^{-1}((L1^2 - L3^2 + L2^2)/(-2 \times L3 \times L2)) \qquad \text{Equation 4}$$

$$L2/\sin A = L1/\sin C \qquad \text{Equation 5}$$

Once angles A and C are known, the location of the center of the geometrical calibration feature 112 of the teach tool 102 relative to the centerline axis 104C is also known. The calibration may be repeated a third time to even more precisely locate the exact center of the geometrical calibration feature 112.

Once the center location of the geometrical calibration feature 112 is known, an additional calibration routine may be executed to determine a vertical location of a vertical geometrical calibration feature 112A of the teach tool 102, as best shown in FIG. 1F. The vertical calibration routine may follow immediately after the center finding routine previously described. In this case, the teach tool 102 is already seated in the sample rack 105 such that the teach tool 102 contacts a known registry point 122 in the bottom of the sample rack 105. The end effector 104 and the light beam 108C of the light beam sensor 108 are first positioned at a known position above the vertical geometrical calibration feature 112A. In this embodiment, the vertical geometrical calibration feature 112A is a flat surface on the top of a cylindrical post extending from the base 114. The end effector 104 and light beam 108C are then lowered in the –Z direction until the light beam 108C is broken, as shown in FIG. 1F. The vertical (Z) position is recorded. Accordingly, the orientation of the sample rack 105 to the end effector 104 and fingers 104A, 104B thereof is now known in the Z direction. The bottom registry point 122 in the Z direction is known because the length of the teach tool is precisely known. Thus, now being calibrated in the X, R, and Z directions, the end effector 104 may precisely pick and place sample containers (not shown) from the sample rack 105 as part of the sample testing and processing in the system.

In another broad aspect of the invention, a calibration method adapted to determine a rotational orientation of the end effector fingers 104A, 104B relative to the teach tool 102 and the article (e.g., sample rack 105) is provided. This calibration may be accomplished in addition to the center-finding calibration method and/or the vertical calibration method where it is desired to know the rotational orientation of the end effector fingers 104A, 104B relative to an article. According to the method, the teach tool 102 may be engaged (e.g., gripped) by the end effector 104 (e.g., by gripper fingers 104A, 104B) as shown in FIG. 1H. The teach tool 102 may be grasped by the geometrical calibration feature 112 comprising a cylindrical post by the fingers 104A, 104B oriented in any random rotational orientation. The teach tool 102, including the bar code 130 that has been placed in a predefined location on the teach tool 102, may be rotated relative to a bar code reader 132. The bar code reader 132 may be placed in the testing or processing system at any defined location. In general, the system may already include the bar code reader 132 to be able to read bar code labels 130 on sample containers being processed by the system. The teach tool 102 is rotated until a known feature of the tool is recognized by the bar code reader 132 (e.g., a detectable edge location 130A on the bar code 130). Other features may be used. The rotational orientation of the feature 130A is recorded in memory. As previously discussed, the location of the rotational geometrical calibration feature 124 is now generally known (albeit without a great amount of precision) because the orientation of the rotational geometrical calibration feature 124 is generally known relative to the bar code 130. For example, the bar code edge 130A may be aligned vertically with a center of the rotational geometrical calibration feature 124. It should be recognized that the location of the fingers 104A, 104B of the end effector 104 relative to the rotational geometrical calibration feature 124 is not yet known.

Now the teach tool 102 is again placed (bottomed) in the sample rack 105 as shown in FIG. 1J. Then the end effector fingers 104A, 104B are retracted to a position larger than the diameter of the portion of the teach tool 102 including the rotational geometrical calibration feature 124 and lowered to a height of a center of the rotational geometrical calibration feature 124, as shown in FIG. 1K. The end effector 104 is then rotated about axis 104C in either a clockwise or counterclockwise direction. When the light beam 108C first emerges through the rotational geometrical calibration feature 124 and is sensed by the light detector 108D such as shown in FIG. 1L, the first rotational position thereof is recorded. At this point, the rough orientation of the fingers 104A, 104B to the rotational geometrical calibration feature 124 is known. Likewise, the rough orientation of the fingers 104A, 104B to the frame of the system is known, having oriented the bar code detectable edge feature 130A in a previous step.

The end effector 104 may be further rotated until the light beam 108C is no longer detected by the light detector 108D, as shown in FIG. 1M, and this second rotational angle may be recorded. The average of the two angular readings may then be used to determine the exact center of the rotational geometrical calibration feature 124. Thus, based on this, a precise orientation of the fingers 104A, 104B to the sample rack 105, as well as the frame 107 of the system 100, is known. In each of the rotation-determining sequences, the routine may be executed first with a faster rotation for rough orientation determination, followed by a slower rotation (e.g., step by step) to precisely determine the center location of the geometrical calibration feature 112 and/or the angular orientation of the of the rotational geometrical calibration feature 124.

In some instances, the light beam 108C, when first oriented at the rotational geometrical calibration feature 124, will by mere chance be oriented along the rotational geometrical calibration feature 124. In this instance, the end effector 104 will be rotated through a predetermined angle (e.g., 90 degrees) such that the rotational orientation measurement sequence will start with the light beam 108C not passing through the rotational geometrical calibration feature 124, and then carried out as discussed above.

The above calibration methods may be carried out in any order, but will be best implemented by first calibrating the center of the geometrical calibration feature 112, then calibrating the Z axis height of the vertical calibration feature 112A, followed by calibration of the rotational orientation of the fingers 104A, 104B to a center of the rotational geometrical calibration feature 124.

Thus, in one implementation, the calibration method is carried out to determine the orientation of the end effector 104 in the X-R plane, and Z, and T directions. The calibration method is carried out relative to the teach tool 102 including the geometrical calibration feature 112, the vertical calibration feature 112A, and the rotational geometrical calibration feature 124.

One method of calibrating a position of an article relative to an end effector of a robot may be carried out as follows. According to the method, as best shown in FIG. 2 and FIGS. 1A-1E, a robotic component 103 is provided in 202 having the end effector 104 and a light beam sensor 108 provided in a fixed orientation to the end effector 104. A teach tool 102 is provided in 204 at an approximately known location on the article (e.g., a sample rack 105) within a work envelope reachable by the end effector 104. The teach tool 102 has a geometrical calibration feature 112, such as a cylindrical post. The end effector 104 with the light beam sensor 108 is positioned in 206 at a first location proximate to the geometrical calibration feature 112. The end effector 104 is rotated in 208 and a first engagement edge 134 of the geometrical calibration feature 112 of the teach tool 102 is sensed with the light beam sensor 108 (e.g., by breaking the beam 108C). The end effector 104 is again rotated in 210 and a second engagement edge 136 of the geometrical calibration feature 112 of the teach tool 102 is sensed with the light beam sensor 108. The calculation of a location (e.g., the center) of the geometrical calibration feature 112 of the teach tool 102 based upon a location of the first and second engagement edges 134, 136 may be carried out in 212, as discussed above.

Using the above center-finding calibration method, the exact positional center location of the geometrical calibration feature 112 in X-R space may be found. The vertical orientation of the end effector 104 to the article (e.g., a receptacle 106 of the sample rack 105) may be determined by calibrating the vertical geometrical feature 112A as described above. Alternatively, or in addition, the rotational calibration method may be used. Accordingly, the X, R, Z location of the article (e.g., a receptacle 106 of the sample rack 105) may be determined. Moreover, the rotational orientation of the fingers 104A, 104B of the end effector 104 may be determined relative to the article and/or frame of the processing or testing system.

It should be understood that one or more additional teach tools 102 may be used (or moved to other locations) on other system component(s) within the reach of the end effector 104. Thus, positions of other features of an article may be calibrated. For example, the teach tool 102 may be arranged at more than one location of the article (e.g. in more than one receptacle 106 of a sample rack 105) as shown in FIG. 1G. Thus, the general orientation of more than one receptacle 106 of the sample rack 105 may be determined.

Figure 3:
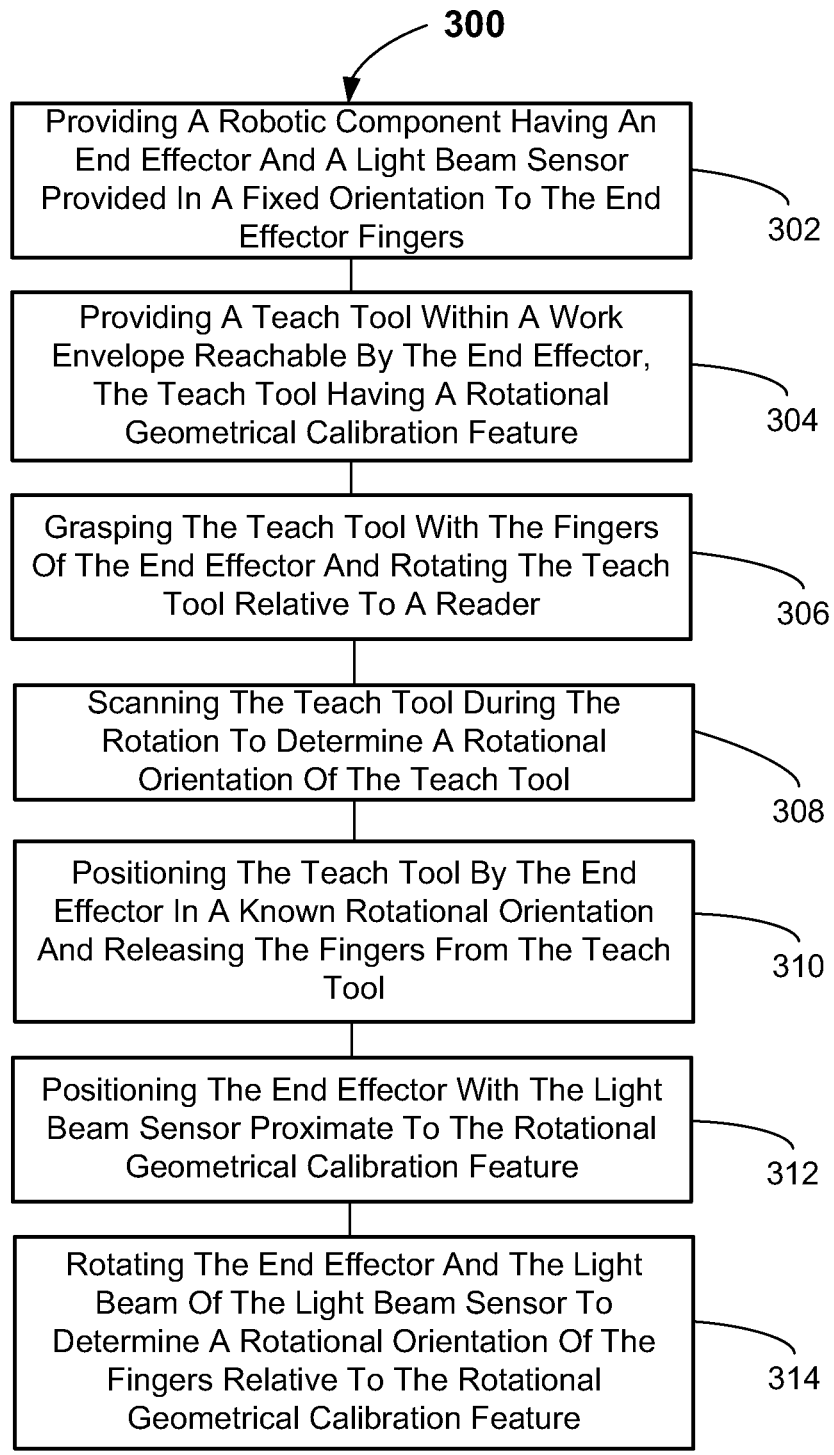
FIG. 3 is a flowchart illustrating a second method according to embodiments of the present invention.

An exemplary method of determining a rotational orientation of the end effector fingers 104A, 104B of the end effector 104 will now be described with reference to FIG. 3 in accordance with another broad aspect of the invention. According to the method 300, a robotic component 103 having an end effector 104 and a light beam sensor 108 provided in a fixed orientation to the end effector fingers 104A, 104B of the end effector 104 is provided in 302. In 304, a teach tool 102 is provided within a work envelope reachable by the end effector 104, the teach tool 102 having a rotational geometrical calibration feature 124. Step 306 involves grasping the teach tool 102 is grasped with fingers 104A, 104B of the end effector 104 and rotating the teach tool 102 relative to a reader (e.g., a bar code reader 132). In 308, scanning of the teach tool 102 during the rotation is undertaken to determine a rotational orientation of the teach tool 102. As discussed above, the scanning aids in locating a feature (edge 130A) of the teach tool 102, which is provided in a fixed orientation to a rotational geometrical calibration feature 124. In 310, the teach tool 102 is positioned (e.g., in a sample rack 105) by the end effector 104 in a known rotational orientation, and the end effector fingers 104A, 104B are released from the teach tool 102. In 312, the end effector 104 with the light beam sensor 108 is positioned proximate to the rotational geometrical calibration feature 124; and, in 314, the end effector 104 and the light beam 108C of the light beam sensor 108 are rotated to determine the rotational orientation of the fingers 104A, 104B relative to the rotational geometrical calibration feature 124. The orientation is determined by sensing the breaking of the light beam 108C on edges of the rotational geometrical calibration feature 124 as described with reference to FIGS. 1L-1M.

While the invention is susceptible to various modifications and alternative forms, specific system and apparatus embodiments and methods thereof have been shown by way of example in the drawings and are described in detail herein. It should be understood, however, that it is not intended to limit the invention to the particular systems, apparatus, or methods disclosed but, to the contrary, the intention is to cover all modifications, equivalents, and alternatives falling within the scope of the invention.

What is claimed is:

1. A method of calibrating a position of an article relative to an end effector of a robot, comprising:
    providing a robotic component having the end effector with end effector fingers that are moveable relative to one another and a light beam sensor provided in a fixed orientation to the end effector fingers and oriented to determine whether the end effector fingers have an item to grasp;
    providing a teach tool at an approximately known location on the article within a work envelope reachable by the end effector, the teach tool having a geometrical calibration feature;
    positioning the end effector with the light beam sensor at a first location proximate to the geometrical calibration feature, the geometrical calibration feature adapted for use to determine a positional calibration;
    rotating the end effector about the centerline axis of the end effector and sensing with the light beam sensor a first engagement edge of the geometrical calibration feature of the teach tool;
    rotating the end effector about the centerline axis of the end effector and sensing with the light beam sensor a second engagement edge of the geometrical calibration feature of the teach tool; and
    using the sensing of the first engagement edge and the second engagement edge to calibrate a position of the article relative to the end effector of the robot.

2. The method of claim 1, further comprising calculating a distance to the location of the geometrical calibration feature of the teach tool based upon a location of the first and second engagement edge.

3. The method of claim 1, further comprising:
    moving the end effector with the light beam sensor to a second location proximate to the geometrical calibration feature of the teach tool, the second location being different than the first location;
    rotating the end effector and sensing with the light beam sensor a third engagement edge of the geometrical calibration feature of the teach tool;
    rotating the end effector and sensing with the light beam sensor a fourth engagement edge of the geometrical calibration feature of the teach tool; and
    calculating a location of the geometrical calibration feature of the teach tool.

4. The method of claim 1, wherein the geometrical calibration feature comprises a cylinder oriented with a cylindrical axis being vertical.

5. The method of claim 1, further comprising receiving the teach tool in a sample tube receptacle of a sample rack, the sample tube receptacle being adapted to receive a sample tube.

6. The method of claim 1, further comprising providing the geometrical calibration feature as a cylindrical post having a flat top surface.

7. The method of claim 2, further comprising:
    positioning the light beam sensor above a center location of the geometrical calibration feature of the teach tool determined by the calculation; and
    moving a light beam of the light beam sensor vertically until an upper engagement edge of a vertical geometrical calibration feature of the teach tool is engaged by the light beam.

8. The method of claim 7, wherein the vertical geometrical calibration feature of the teach tool is a flat surface on a top of a cylindrical post.

9. The method of claim 1, further comprising:
    rotating the teach tool; and
    scanning the teach tool to determine a rotational orientation of the teach tool.

10. The method of claim 9, further comprising:
    scanning a bar code on the teach tool with a bar code reader wherein a position of a rotational geometrical calibration feature is determined based upon a scanned determination of a geometrical feature of the bar code.

11. The method of claim 1, further comprising:
    moving the light beam sensor into vertical alignment with a rotational geometrical calibration feature of the teach tool; and
    rotating the light beam sensor relative to the rotational geometrical feature.

12. The method of claim 11, further comprising:
    recording one or more rotational positions of an interference of a light beam of the light beam sensor with one or more engagement ends of the rotational geometrical calibration feature.

13. A robot calibration system, comprising:
    robotic component having an end effector with end effector fingers that are moveable relative to one another;
    a light beam sensor provided in a fixed orientation to the end effector fingers and oriented to determine whether the end effector fingers have an item to grasp;
    a teach tool coupled to an article at a first location, the teach tool including a geometrical calibration feature; and a controller adapted to command a robotic component to rotate a light beam of the light beam sensor about the centerline axis of the end effector around the geometrical calibration feature of the teach tool and calculate a position of a center of the geometrical calibration feature based upon edge interferences between the geometrical calibration feature and the light beam.

14. The robot calibration system of claim 13, wherein the teach tool further includes a vertical geometrical feature, the controller adapted to move the light beam emitted from the light beam sensor vertically relative to the vertical geometrical feature to determine a height dimension of the vertical geometrical feature.

15. The robot calibration system of claim 13, wherein the teach tool includes a rotational geometrical feature and the controller is adapted to rotate the light beam of the light beam sensor relative to the rotational geometrical feature of the teach tool to determine a rotational orientation of the rotational geometrical feature.

16. The robot calibration system of claim 13, comprising a bar code on the teach tool having a defined location relative to the rotational geometrical feature.

17. A calibration assisting tool, comprising:
a base including a configuration adapted to couple to a receptacle of a sample rack;
a first cylindrical post geometrical calibration feature extending from the base, the first cylindrical post geometrical calibration feature adapted to calibrate a geometrical center of the receptacle;
a second flat surface geometrical calibration feature adapted to calibrate a vertical orientation of a bottom registry point of the receptacle; and
a third crosswise geometrical calibration feature extending crosswise through the base or cylindrical post and adapted to calibrate a rotational orientation about the tool axis of the tool.

18. The calibration assisting tool of claim 17, comprising:
a bar code label provided on the base, wherein the third crosswise geometrical feature is oriented in a fixed orientation relative to the bar code label.

19. The calibration assisting tool of claim 18, comprising:
at least one groove on the base to which the bar code label is aligned.

20. A method of calibrating a rotational position of end effector fingers of an end effector, comprising:
providing a robotic component having the end effector and the end effector fingers that are moveable and adapted to grasp a component and a light beam sensor provided in a fixed orientation to the end effector fingers;
providing a teach tool within a work envelope reachable by the end effector, the teach tool having a rotational geometrical calibration feature;
grasping the teach tool with the end effector fingers of the end effector and rotating the teach tool relative to a scanner;
scanning the teach tool with a bar code reader during the rotation to determine a rotational orientation of the teach tool;
positioning the teach tool with the end effector in a known rotational orientation and releasing the end effector fingers from the teach tool;
positioning the end effector with the light beam sensor proximate to the rotational geometrical calibration feature; and
rotating the end effector and the light beam of the light beam sensor about the centerline axis of the end effector to determine the rotational orientation of the fingers relative to the rotational geometrical calibration feature.

* * * * *